United States Patent Office 3,492,260
Patented Jan. 27, 1970

3,492,260
POLYMERIZATION OF CROSSLINKABLE POLYMERS
Carlos M. Samour, Wellesley Hills, Mass., and Donatas Satas, Palatine, Ill., assignors to The Kendall Company, Boston, Mass., a corporation of Massachusetts
No Drawing. Filed Nov. 7, 1966, Ser. No. 592,254
Int. Cl. C08f 15/40, 1/13; C09j 3/14
U.S. Cl. 260—29.7         12 Claims

ABSTRACT OF THE DISCLOSURE

An aqueous emulsion polymerization system for the preparation of an emulsion of latently crosslinkable polymers wherein one of the comonomers such as an amic acid or acid ester is in salt form and one of the essential comonomers is selected from the group consisting of acrylamide, methacrylamide, acrylonitrile, methacrylonitrile, cyanoethylacrylate and cyanoethylmethacrylate. The polymer produced may be coagulated from the dispersion thereof in its uncrosslinked state and then subsequently crosslinked by heating.

---

This invention relates to an improved emulsion polymerization process for the preparation of latently self-crosslinkable polymers. The invention also relates to an improvement in the production of dispersions or emulsions of latently self-crosslinkable polymers and the utilization of the same, particularly in the manufacture of pressure-sensitive adhesive polymers and adhesive tapes.

Emulsion polymerization is a well known technique for polymerizing ethylenically unsaturated monomers capable of addition polymerization. In this technique of polymerization, the monomer or mixture of monomers are subjected to polymerization conditions while dispersed as emulsion droplets in an aqueous medium. The reaction mixture is agitated, simple stirring is often sufficient, to disperse the water insoluble monomeric constituents in the form of emulsion droplets in the aqueous medium. An essential ingredient is an emulsifying agent which aids in the formation and stabilization of the monomer droplets in the emulsion. For this purpose, surface active agents such as soaps or detergents are widely employed. Desirably, the emulsifying agent is such to also aid in the stabilization of the polymer dispersion produced.

It is difficult to separate the emulsifier from the resultant polymer. Herein lies one of the major drawbacks of emulsion polymerization. The emulsifier may have a contaminating influence on the properties of the polymer for some applications. For example, coatings of the polymer prepared directly from the dispersion of the polymer or polymer latex are limited to applications where the presence of the emulsifier is not considered deleterious. Furthermore, undesirable amounts of water may be entrapped in the polymer coagulum and present difficulties in subsequent processing of the polymer.

In the copending application of one of the present joint inventors, Ser. No. 592,274, filed Nov. 7, 1966, there is disclosed an aqueous emulsion polymerization process without the use of an external or added emulsifying agent. The process of said copending application is applicable to the polymerization of certain ethylenically unsaturated monomers capable of addition polymerization. The essential monomers of the monomeric constituents in the reaction medium are certain alkyl acrylate or methacrylate monomers and carboxylic acid monomers. All or a portion of the carboxylic acid monomers are present in the reaction mixture in the form of a salt, as may be obtained by reaction with a base in the reaction mixture itself to provide hydrophyllic anionic salt groupings on the monomers. Simple agitation of the aqueous reaction mixture results in the formation of an emulsion of the monomeric constituents in the water.

The emulsion provides an excellent medium in which the polymerization reaction can be conducted. The salt monomers are copolymerized and thus become polymerically combined in the polymer. The polymer containing the salt monomer as recurring units therein may be produced as a reasonably stable aqueous dispersion of the polymer, i.e., a latex. The polymer thus is "self-emulsified" since the reaction mixture and resulting latex contains no added soap or emulsifying agent. The polymer dispersion subsequently may be treated to destroy the emulsion and coagulate the polymer in either its salt form or its free carboxylic acid form. The polymer thus may be produced without the aid of external emulsifiers and accordingly may be characterized as an emulsifier-free emulsion polymerization process.

The present invention is an improved emulsifier-free process for the production of latently crosslinkable polymers. In the practice of this invention, the aforementioned monomers are copolymerized with a minor amount of a crosslinking monomer and at least one monomer selected from the group consisting of acrylamide, methacrylamide, acrylonitrile, methacrylonitrile, cyanoethylacrylate and cyanoethylmethacrylate. The crosslinking monomer is a polyethylenic monomer. The polymerization of the monomers in an aqueous emulsion, free of added emulsifying agents, is conducted under controlled conditions to produce a polymer soluble in solvents, e.g., soluble for the preparation of polymer solutions suitable for use in solvent spreading or casting of polymers. The polymer subsequently can be converted without the aid of catalysts to a crosslinked polymer, as evidenced by resistance to solvents, including the very same solvent of the solution from which the polymer was spread or cast, and a comparison of gel content and the swelling index of the gel before and after conversion to its crosslinked state.

The function of the amide, nitrile and cyano comonomer is not fully understood. Latently crosslinkable polymers suitable for use as per se pressure-sensitive adhesive polymers produced by the present process with these comonomers are generally superior to latently crosslinkable polymers without the comonomer. The superiority in adhesive properties is exhibited by improved resistance to mass splitting at elevated temperatures and improved creep resistance without a deleterious reduction in tack and adhesion. Polymers which were prepared without the comonomer, but otherwise prepared under similar conditions, could be subsequently crosslinked. However, these crosslinked polymers behaved somewhat like low molecular weight polymers, as though a crosslinked fraction was surrounded by a low molecular weight fraction. The behavior of the crosslinked polymer was similar to that which one can obtain with an adhesive system containing a non-reinforcing filler.

The improvement obtained in accordance with this invention is not fully explainable as due solely to the presence of the amide, nitrile or cyano comonomers as recurring units in the polymer. Whereas these comonomers are essential to self-crosslinkable polymers produced by the present emulsifier-free process, they are not an essential comonomeric constituent in the polymerization of some cross-linkable polymers produced by emulsion systems employing conventional, added emulsifying agents. Satisfactory cross-linkable pressure-sensitive adhesive polymers may be prepared by emulsion polymerization with an emulsifier. This suggests that the mere presence of the amide, nitrile or cyano recurring units in the polymer does not account for the observed differences in properties.

Briefly, in the process of this invention, a reaction mixture is prepared containing water, the copolymerizable monomeric constituents, a catalyst to initiate the polymerization reaction and a base. An emulsion is formed by agitating the reaction mixture. Preferably the reaction vessel is purged with nitrogen and maintained to provide an inert atmosphere. The temperature of the reaction mixture is controlled so as not to exceed about 40° to 45° C. The polymerization reaction is exothermic. Ordinarily, an initial temperature of the reaction medium of about 5° to 10° C. at the time the catalyst is added and a rate of cooling to permit a 10° to 20° rise in temperature will be sufficient. The resulting polymer emulsion may then be treated to coagulate the polymer, as by combining the reaction mixture with an acid. The coagulated polymer may be dissolved in a solvent and, as in the case of a pressure-sensitive adhesive polymer, be coated on an appropriate tape backing in accordance with conventional methods of manufacturing solvent spread adhesive tapes. Alternatively, the polymer emulsion may be coated on the tape backing. In either case, the polymer is converted to its crosslinked state by drying at room temperatures or at oven drying temperatures. The conversion to its cross-linked state can occur in a matter of minutes at temperatures which do not deleteriously affect the polymer.

The copolymerizable monomeric constituents consist essentially of (1) an ester monomeric constituent and (2) a carboxylic acid monomeric constituent and a minor proportion of (3) a crosslinking monomeric constituent and (4) at least one monomer selected from the group consisting of acrylamide, methacrylamide, acrylonitrile, methacrylonitrile, cyanoethylacrylate and cyanomethacrylate. The sum total of the monomeric constituents (3) and (4) should not exceed about 30% by weight of the polymer. In the case of the production of per se pressure-sensitive adhesive polymers, the amount of the cross-linking monomer (3) employed in the reaction mixture does not exceed about 7% and the monomeric constituent (4) does not exceed about 15% by weight of the polymer. Whereas the cyano and nitrile monomeric constituents (4) may be employed in amounts up to 15%, the amounts of acrylamide and methacrylamide monomers should not exceed about 5% by weight of the polymer, in the case of the pressure-sensitive adhesive polymers. For these adhesive polymers, the sum total of monomeric constituents (3) and (4) preferably is from 1.25% to 15% by weight of the polymer, in which the monomeric constituent (3) is present from 0.25 to 5% and the monomeric constituent (4) is present from 1 to 10%. The preferred amount of the acrylamide or methacrylamide monomeric constituent (4) is from 1 to 3% in the case of the pressure-sensitive adhesive polymers.

(1) Ester monomeric constituent

The ester monomeric constituent consists of alkyl acrylate monomers and alkyl methacrylate monomers, or mixtures thereof, in which the respective alkyl groups contain from 1 to 10 carbon atoms.

(2) Carboxylic acid monomeric constituent

The carboxylic acid monomeric constituent consists of amic acid monomers or acid ester monomers corresponding to the formula

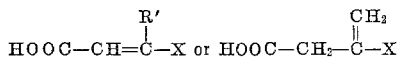

wherein X is —CONRR' in the case of amic acid monomers and either —COOR or

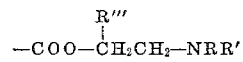

in the case of acid ester monomers. R' is either hydrogen or an alkyl group containing from 1 to 10 carbon atoms and R" and R"' are, independently, hydrogen or methyl. Further, said carboxylic acid monomeric constituent is selected from the groups of amic acid and acid ester monomers in which R is alkyl, as hereinafter defined, said groups consisting of:

(a) An individual amic monomer in which the R alkyl group contains from about 10 to 24 carbon atoms, (b) A mixture of amic acid monomers in which the number of carbon atoms in the R alkyl groups average from about 10 to 24, the amic acids of said mixture being selected from the group consisting of the amic acids containing from 1 to about 28 carbon atoms in the R alkyl groups thereof, (c) An individual acid ester monomer in which the R alkyl group contains from about 6 to 24 carbon atoms in the alkyl group, (d) A mixture of acid ester monomers in which the number of carbon atoms in the R alkyl groups average from about 6 to 24, the acid esters of said mixture being selected from the group consisting of the acid esters containing from 1 to about 24 carbon atoms in the R alkyl groups thereof, and (e) Mixtures of amic acid and acid ester monomers selected from the group consisting of mixtures of (a) and (c) groups of monomers, mixtures of (a) and (d) groups of monomers, mixtures of (b) and (c) groups of monomers and mixtures of (b) and (d) groups of monomers.

In the case of N-dialkyl amic acids of the foregoing formula wherein R' and R are both alkyl, the alkyl group containing the greater number of carbon atoms shall be the R group. Either alkyl group may be designated the R group in the case where both R' and R are alkyl groups having the same number of carbon atoms.

Monomers of the foregoing groups are the amic acids and acid esters of maleic acid, fumaric acid, citraconic acid and itaconic acid. The preferred monomers are those in which the R alkyl groups are branched.

As indicated above, all or a portion of the carboxylic acid monomeric constituent is present in the reaction mixture in the form of carboxylate salt monomers. The salt monomers conveniently are formed in the reaction mixture by the addition of the acid monomers and base to the aqueous medium of the reaction vessel. The salt monomers may also be formed separately and then added as such to the reaction vessel and this is to be considered equivalent to the process where the salt monomers are formed in the reaction vessel. In any event, sufficient salt monomer is present in the reaction mixture to produce an emulsified reaction mixture when the ester monomeric constituent is present and the mixture is agitated to disperse the monomers in the aqueous phase.

Generally, it will be found that about 5 parts of the salt monomer per 100 parts total of the ester monomeric constituent and, if any, the carboxylic acid monomeric constituent in its free acid from, is sufficient to produce an emulsified reaction mixture upon simple agitation, as by stirring. The amount necessary for this purpose depends upon the composition of the ester monomeric constituent, the composition of the carboxylic acid monomeric constituent, if any, present in its free acid form, the amount and nature of other copolymerizable monomers present in the reaction mixture and the composition of the salt monomer. Generally, better emulsions of the reaction mixtures and more stable polymer dispersions are obtained in the case of salts of the mixtures of the carboxylic acid monomers described in groups (b) and (d) of the Markush group set forth above. To illustrate by specific reference to maleamic acid monomers: if the object is to produce a polymer containing only a minor amount of recurring units therein corresponding to N-alkyl maleamic acid monomers, or their salts (e.g., a polymer consisting predominantly of all acrylate recurring units), then the salt form of a group (b) mixture of maleamic acids is recommended over the salt of an individual N-alkyl amic acid of group (a). Group (b) mixtures in which all or substantially all of the amic acids thereof have R-alkyl groups containing 10 and more carbon atoms are preferred over group (b) mixtures containing a larger number of amic acids having less than 10 carbon atoms in the R-alkyl groups. In the case of acid esters, the preferred mixtures encompassed by the group (d) mixtures are those containing a greater proportion of acid esters having 6 or more carbon atoms in the R-alkyl groups.

(3) Crosslinking monomeric constituent

This constituent consists of crosslinking monomers which are polyethylenically unsaturated monomers containing at east two ethylenic groups, non-conjugated with respect to each other. These groups are the reactive sites in the crosslinking monomer at which they are copolymerized with the other monomers. The ethylenic group may be a terminal ethylenic group; as such it may be either of two types: a vinyl group or a vinylidene group. The ethylenic group may be a non-terminal ethylenic group, in which case it is located conjugate to a hetero double bond in the monomer. A hetero double bond is defined herein as a double bond between a carbon atom and an atom other than carbon. The crosslinking monomer may be a monomer containing only terminal ethylenic groups, or a monomer containing both terminal and non-terminal ethylenic groups. Monomers of the type described here are known as crosslinking monomers for addition to the monomer charge in polymerization systems other than those of concern here.

Examples of crosslinking monomers are monoesters of terminally unsaturated alcohols, such as allyl and vinyl alcohols, and ethylenically unsaturated acids such as acrylic, methacrylic, fumaric, maleic, citraconic and itaconic acids; diesters of terminally unsaturated and saturated dicarboxylic acids, such as the diallyl maleate, fumarate, succinate, adipate and phthalate esters; polyesters of polyalcohols and unsaturated mono and dicarboxylic acids, such as ethylene difumarate, ethylene diacrylate and dimethacrylate, polyethylene glycol dimethacrylate, triethylene glycol dimethacrylate, 1,3-butylene glycol dimethacrylate, tetraethylene glycol dimethacrylate, the trimethacrylate of trimethylol propane, butyne dimethacrylate, cyclohexane dimethanol dimethacrylate, and pentaerythritol tetraacrylate and the dimaleate of 2,3-dimethyl pentanedid-2,4; and divinyl benzene, alkylene bis-acrylamide bis-methacrylamides and diamic acids such as N,N'-ethylene diacrylamide or methacrylamide and N,N'-ethylene dimaleamic acid; unsaturated ethers such as divinyl ether, diallyl glycerol, diallyl sorbitol and diethylene glycol divinyl ether. The preferred crosslinking monomers are the polyesters of polyalcohols and acrylic or methacrylic acid. Of these, the polyester of acrylic or methacrylic acid and polyethylene glycol is preferred.

(4) Amide, nitrile, cyano constituent

This constituent is acrylamide, methacrylamide, acrylonitrile, methacrylonitrile, cyanoethylacrylate, cyanoethylmethacrylate or mixtures thereof.

The bases used in this process are those which are reactive with the carboxylic acid monomers to form the corresponding salt monomers having a hydrophyllic carboxylate salt grouping thereon. Suitable bases are monovalent inorganic and organic bases. Examples of bases are ammonium hydroxide (which may be provided by the addition of ammonia to the aqueous reaction mixture), water soluble alkali metal hydroxides such as sodium hydroxide and potassium hydroxide; and primary, secondary and tertiary amines in which the groups attached to the amino nitrogen atom consist essentially of carbon and hydrogen atoms, such as cyclic and acyclic alkyl, hydroxyalkyl and alkyl ether groups in which the number of carbon atoms in the groups on the amino nitrogen atom total no more than about 20, e.g., ethylamine, diethylamine, dimethylamine, hexylamine, laurylamine, dimethylethanolamine, dimethylisopropanolamine and morpholine.

The practice of this invention is particularly advantageous in the production of certain of the pressure adhesive polymers disclosed in pending patent applications Ser. No. 386,476, filed July 21, 1964, now U.S. Patent 3,299,010, and Ser. No. 592,274, filed Nov. 7, 1966. The present process is particularly suitable for the preparation of those polymers of these pending applications which are pressure-sensitive adhesive polymers of monomers consisting essentially of about 30 to 95 parts by weight of an ester monomer as hereinbefore defined and, correspondingly, 70 to 5 parts by weight of:

(1) A mixture of amic acid monomers of the (b) group above defined in which, further, the amic acids which contain more than about 6 carbon atoms in the R alkyl groups consist essentially of amic acids in which the alkyl groups are branched alkyl groups or (2) A mixture of acid ester monomers of the (d) group above defined wherein, further, the number of carbon atoms in the R alkyl groups of the monomers average at least about 8 and the acid ester monomers in the mixture which contain more than about 6 carbon atoms in the alkyl groups consist essentially of acid esters in which said alkyl groups are branched alkyl groups.

In each case, the mixtures of monomers are liquid to semisolid viscous non-crystalline compositions. This requirement is met, as the average size of the R alkyl group increases above 8 carbon atoms, by increasing the extent of branching in the R alkyl groups of the individual monomers and by increasing the number of monomers in the mixture containing dissimilar R alkyl groups, all as taught in said pending applications. In the production of the adhesive polymers, the monomeric constituents are copolymerized with the weight proportions stated, but not to exceed a mol ratio of 1:1. The preparation of these pressure-sensitive adhesive polymers by the present process represent preferred embodiments of this invention and are illustrated in detail in the following examples.

The carboxylic acid monomer "N-t-$C_{12}$ maleamic acid" in the following examples is a mixture of maleamic acid monomers prepared by the amidation of maleic anhydride with a complex mixture of t-alkyl primary amines marketed by The Rohm and Haas Company. The t-alkyl groups are highly branched alkyl groups. Primene 81–R is one of a series of t-alkyl amines marketed by this company containing such amines as t-butyl amine; 1,1,3,3-tetramethylbutyl amine; 1,1,3,3,5,5 - hexamethylhexyl amine; 1,1,3,3,5,5,7,7 - octamethyloctyl amine; 1,1,3,3,5,-5,7,7,9,9 - decamethyldecyl amine; and 1,1,3,3,5,5,7,7,9,-9,11,11-dodecamethyldodecyl amine. Primene 81–R consists principally (90%) of $C_{11}$ to $C_{14}$ branched alkyl amines. The neutral equivalent of Primene 81–R is 191 corresponding to an alkyl amine having an average alkyl group of about 12 carbon atoms.

The following examples represent preferred embodiments of the process for the preparation of crosslinkable pressure-sensitive adhesive polymers. The lauryl methacrylate and acrylic acid are optional comonomers which may be added to the reaction mixture in an amount no greater than about 20 parts per 100 parts total of the ester and carboxylic acid monomeric constituents (1) and (2).

EXAMPLE 1

Monomer composition:
Monomeric constituents (1) and (2):
  Ethyl acrylate, ethylhexyl acrylate and N-t-$C_{12}$ maleamic acid in the molar proportions of 1:4:1 _____gms.___ 100
Crosslinking constituent (3):
  Polyethyleneglycoldimethacrylate __gms.___ 5.0
Amide constituent (4):
  Acrylamide _____gms.___ 1.5
Other comonomers:
  Lauryl methacrylate _____gms.___10.0
  Acrylic acid _____gms.___ 5.0
Water _____gms.___ 325
Base: Ammonium hydroxide.
Catalyst system:
  Hydrogen peroxide (3% in water)____gms.___ 10.0
  Reductant _____cc.___ 10.7

The monomers were thoroughly mixed together for about ½ hour. The water and ammonium hydroxide were separately mixed in a reaction vessel and vigorously stirred while flushing the vessel with $N_2$ gas. The monomer composition was added and the mixture stirred with formation of an emulsion. The amount of the ammonium hydroxide in the mixture was sufficient to neutralize all of the acrylic acid and 70% of the maleamic acid monomers. Accordingly, the reaction mixture contains approximately 18 parts of the ammonium salt of the N-t-$C_{12}$ maleamic acid monomer. After flushing for about ½ hour with nitrogen, the emulsion was then cooled in an ice ath to about 12.0° C. The peroxide was added all at once and the reductant added dropwise until an increase in temperature of the reaction mixture was observed. The temperature rose to a maximum of about 15.5° C. during the reaction. The reductant was a mixture of 0.5 gm. ascorbic acid and 0.02 gm. ferrous ammonium sufate in 10 cc. of water. When no further rise in temperature was observed, the ice bath was removed. Stirring was continued at room temperature for about one hour.

The emulsion was then poured into dilute hydrochloric acid to neutralize the base and convert the salt carboxylate groupings in the polymer to their free acid form. The emulsion was thus broken and the polymer coagulated. The coagulum was washed with water. A 20% solution of the polymer coagulum in toluene was prepared.

This solution was spread upon polyethyleneterphthalate film. The coated film was air dried at ordinary room temperatures. Samples of the resulting pressure-sensitive adhesive tape were then tested for adhesive properties without any further treatment. Other samples were cured by heating at 150° C. for 3 minutes and then tested for the same properties. The gel content and swelling index (S.I.) of the gel in the adhesive polymer for both the cured and uncured samples were also determined.

| | Adhesion Data | | | | | Gel Data | |
|---|---|---|---|---|---|---|---|
| | At 75° F. | Splitting ° F. | Oz. | Tack | Creep, hrs. | Percent | S.I |
| No cure, Sample 1-A | 82 | 77 | 94 | 555 | 24 | 41 | 17 |
| Cured, Sample 1-B | 46 | 85 | 87 | 785 | 90 | 71 | 19 |

The gel in the uncured sample formed during the solvent drying step. The polymer from the reaction vessel dissolved in the toluene. The toluene solution contained no gel.

EXAMPLE 2

The polymerization reaction of Example 1 was repeated, with the following changes in the recipe. Acrylic acid was omitted from the monomer composition. Ammonium hydroxide was present in an amount equivalent to 60% neutralization of the maleamic acid monomers. About 4.9 cc. of the reductant was added to the reaction mixture. The maximum temperature was reached during the reaction was about 21.5° C.

The polymer was coagulated, a toluene solution of the polymer was prepared and pressure-sensitive adhesive tapes made as in Example 1.

| | Adhesion Data | | | | | Gel Data | |
|---|---|---|---|---|---|---|---|
| | At 75° F. | Splitting ° F. | Oz. | Tack | Creep, hrs. | Percent | S.I. |
| No cure, Sample 2-A | 120 | 65 | 168 | 1,078 | .01 | 5 | 8 |
| Cured, Sample 2-5 | 84 | 98 | 92 | 1,156 | N.C. | 63 | 20 |

The letters "N.C," above, means that there was no measurable movement of the tape during at least 100 hours of testing.

EXAMPLE 3

The polymerization reaction of Example 1 was repeated, with the following recipe variations. Double the amount of acrylamide was employed. The amount of ammonium hydroxide employed was equivalent to neutralize all of the acrylic acid and only 52% of the maleamic acid monomers. About 3.8 cc, of the reductant was added to the reaction mixture. The temperature rose a maximum of about 5.5° C. during the reaction. A small amount of prepolymer formed and separated. Tapes were prepared from the polymer as described in Example 1.

| | Adhesion Data | | | | | Gel Data | |
|---|---|---|---|---|---|---|---|
| | At 75° F. | Splitting ° F. | Oz. | Tack | Creep, hrs. | Percent | S.I. |
| No cure, Sample 3-A | 24 | 150 | 35 | 330 | N.C. | 70 | 7 |
| Cured, Sample 3-B | 17 | 190 | 27 | 400 | N.C. | 77 | 6 |

EXAMPLE 4

The polymerization reaction of Example 1 was repeated, with the following changes in the recipe. The lauryl methacrylate was omitted from the monomer composition. The acrylamide was replaced with 2.0 gms. of acrylonitrile. The hydrogen peroxide was replaced with 0.8 gm. of tertiary butyl hydrogen peroxide (70% in a non-aqueous solvent). 2.7 cc. of the reductant was employed. In this case the monomers and the ammonium hydroxide were mixed together for about ½ hour and then added to the water in the reaction vessel which was flushed with nitrogen gas. This mixture was then stirred with the formation of an emulsion. The amount of ammonium hydroxide in the mixture was sufficient to neutralize all of the acrylic acid comonomer and 60% of the maleamic acid monomer. Accordingly, the reaction mixture contained approximately 15.4 parts of the ammonium salt of the N-t-$C_{12}$ maleamic acid monomer. After flushing for about ½ hour with nitrogen, the emulsion was then cooled in an ice bath to about 11° C. The peroxide was added all at once and the reductant added dropwise until an increase in temperature of the reaction mixture was observed. The temperature rose to a maximum of about 18.0° C. during the reaction. When no further rise in temperature was observed, the ice bath was removed. Stirring was continued at room temperature for about one hour. The polymer was coagulated as in Example 1 and tapes prepared from a 10% solution of the polymer in toluene.

|  | Adhesion Data | | | | Creep, hrs. | Gel Data | |
|---|---|---|---|---|---|---|---|
|  | At 75° F. | Splitting ° F. | Oz. | Tack |  | Percent | S.I. |
| No cure, Sample 4-A | Adh. | | f. | 640 | >72 | 57 | 21 |
| Cured, Sample 4-B | 29 | >190 | | 700 | N.C. | 73 | 51 |

EXAMPLE 5

This polymer was prepared following the procedure of Example 4 with the following changes in the recipe. The acrylonitrile was replaced with 2.0 gms. of cyanoethylacrylate and 1.5 cc. of the hydrogen peroxide was used. The polymer was coagulated, dissolved in toluene and tapes made therefrom as in Example 4.

|  | Adhesion Data | | | | Creep, hrs. | Gel Data | |
|---|---|---|---|---|---|---|---|
|  | At 75° F. | Splitting ° F. | Oz. | Tack |  | Percent | S.I. |
| No cure, Sample 5-A | 42 | 105 | | 550 | N.C. | 5 | |
| Cured, Sample 5-B | 36 | 190 | | 600 | N.C. | 71 | 17 |

For pressure-sensitive adhesive polymers exhibiting no splitting at elevated temperatures during peel adhesion, good or improved creep resistance and a satisfactory level of tack and adhesion, it is recommended that neutralizations in the 45–85% range be employed for the carboxylic acid monomer and that all of any other acid monomers present be neutralized. The degree of neutralization of the carboxylic acid comonomer may range from about 25% to 100%. Ammonium hydroxide or dimethylethanolamine is preferred when operating at the high degrees of neutralization. The use of some bases in amounts greater than that equivalent to neutralize 70% to 85% of the carboxylic acid monomer under some conditions tends to produce distinct fractions of low and high molecular weight polymers. At low neutralization, less than about 50% prepolymer may be formed with premature crosslinking.

The present process is useful in the aqueous emulsion polymerization of monomers capable of addition polymerization to produce polymers in which the aforedescribed ester monomeric constituent (1) and carboxylic acid monomeric constituent (2) constitute at least about 50% by weight of the polymer. Examples of other comonomers, in addition to those illustrated in the examples which may be copolymerized with the monomeric constituents (1), (2), (3) and (4) in accordance with this invention are monoethylenically unsaturated esters and amides of aforementioned acids and various alcohols and amines; the acids themselves; vinyl pyridine; vinyl acetate; and styrene. It will be appreciated that the maximum amount of the other comonomer which may be copolymerized in accordance with this emulsion process without the aid of an added emulsifier may vary within these limits depending upon the nature of the monomers in the monomer charge. Generally, long chain alkyl esters, such as the lauryl methacrylate of some of the examples, should not be present in the monomer charge in amounts greater than 20% by weight of the total monomer charge. The minimum relative proportion of the ester and salt monomers (1) and (2) to provide an emulsion for a given system with other comonomers may be determined by simple experimentation, e.g., the other comonomers including monomers (3) and (4) may be mixed with water and then the ester and salt monomers may be added thereto with agitation of the mixture until emulsification occurs.

The polymerization catalysts employed in this process are those which act as a source of free radicals and act upon the monomers to initiate polymerization. Various initiating systems or catalyst compositions are known for the polymerization of monomers by addition polymerization in aqueous emulsion systems for various polymerizing conditions. The redox catalyst system has been found suitable and is preferred in this process, such as peroxide and persulfate combinations with a reductant such as ferrous sulfate. Satisfactory results have been obtained with organic peroxides such as t-butyl hydroperoxide, t-butyl peroxymaleic acid and cumene hydroperoxide. It is advisable to also employ a bisulfite reductant in the process of this invention when the pH of the emulsion is less than about 7. The pH of the reaction mixture should not be less than about 5.5–6. Generally, the pH of the reaction mixture preferably should be about 6.5 to 7.5–8. The polymerization reaction is exothermic.

The polymer may be coagulated either by converting the salt groupings of the polymerically combined constituent (2) to their free carboxylic acid form, or by the addition of a water miscible, organic, liquid polar compound to the polymer dispersion. The conversion from the salt to acid form may be accomplished simply by the addition of an acid to the polymer dispersion. Any acid reactive with the salt grouping to convert it to its free acid form may be employed for this purpose. Hydrochloric acid is preferred simply from the standpoint of cost and convenience. In the instances of salts formed from volatile bases, such as ammonium hydroxide and dimethylethanolamine, the polymer dispersion may be heated to drive off the ammonia or amine to coagulate the polymer. In either case, all or a portion of the salt groupings in the coagulated polymer may be converted to the free acid form. Coagulation of the polymer without conversion of the salt groupings to the free acid form is possible by mixing the polymer dispersion with a water miscible, polar compound. Examples of water miscible, organic, liquid polar compounds are methanol, ethanol, isopropanol, butanol, methylethylketone, acetone, acrylonitrile, dimethylformamide, dimethylsulfoxide, methyl formate, ethyl formate and isopropyl acetate.

In the case of the pressure-sensitive adhesive polymers of said U.S. Patent 3,299,010 and Serial No. 592,274, prepared by the present invention, the relative proportions of the ester monomer and the carboxylic acid monomer should be as follows:

| (1) Ester monomer | (2) Carboxylic acid monomer | Proportions, by wt. |
|---|---|---|
| Acrylate | Amic acid | 19:1-3:7 |
| Methacrylate | do | 19:1-2:3 |
| Acrylate | Acid ester | 19:1-3:7 |
| Methacrylate | do | 19:1-2:3 |

In the instance where the ester monomer is all alkyl methacrylate, the alkyl group should contain at least 4 carbon atoms. The ester monomer should not constitute more than about 80 parts per 100 parts of total ester and carboxylic acid monomers if the ester monomeric constituent is all alkyl acrylate containing less than 3 carbon atoms in the alkyl group..

The present process may be employed in the manufacture of polymers suitable for a variety of uses, e.g., as coatings, hot melt adhesives and binders for nonwoven fabrics. The process is useful in preparing polymers consisting predominantly of the ester monomers which may be employed as substitutes for homacrylate polymers. Polymers consisting predominantly of the carboxylic acid monomers are thermoplastic and may be made into sheet or other fabricated forms. Rubbery elastomeric polymers which are not per se pressure-sensitive adhesive polymers may be employed as the rubbery ingredient in a multicomponent adhesive by mixing with tackifier resins, plasticizers and the like.

All tape samples tested were one inch in width. The adhesive data were obtained in a peel adhesion test in which test samples are pressed into contact with a stainless steel surface by rolling a five pound roller once over the backside of the tape and then stripping the tape from the surface at a 180° angle. The value in the 75° F. column is the force required in ounces to remove the tape from the surface at 75° F. The temperature at which the adhesive splits during the test and the peel force at that temperature are also measured.

The tack was measured on a probe teak apparatus of the type marketed by TMI, Inc. under the trade name Polyken Probe Tack Tester. The probe was a cylindrical steel probe ¼" in diameter. The smooth, polished end surface of the probe was brought into contact with the adhesive surface for one second at a contact pressure of one pound per square inch of contact surface. The force required to separate the adhesive surface from the probe surface is reported in grams.

In the creep resistance test, the tape was applied to a vertical stainless steel surface at room temperature. A 2.2 kg. weight was suspended to the bottom free end of the tape. The length of time in which the tape moves downwardly a distance of ½" is reported as the creep resistance.

The percent gel is a measurement of the insolubility of the polymer. The swelling index (S.I.) is a measurement of the "tightness" of the gel. These measurements are indicative of crosslinking and the extent of crosslinking. In these determinations, a tape sample was immersed in toluene in a closed container and tumbled for 1 to 3 hours after which the adhesive mass, if any, on the tape backing was scraped off the backing and placed in the solvent. The amount of adhesive in the container was determined by subtracting the weight of the scraped and dried backing from the weight of the tape sample. Tumbling was then continued for at least about 12 hours. Insoluble polymer was filtered from the toluene and weighed while still wet (swollen) with solvent and then dried and weighed. The percent gel was obtained by dividing the weight of the dried insoluble polymer by the weight of the adhesive polymer prior to immersion in the toluene. The swelling index was obtained by dividing the difference obtained by subtracting the weight of the dried insoluble polymer from the weight of the "wet" (swollen) insoluble polymer by the weight of the dried insoluble polymer. References herein to get content and swelling index shall mean the percent gel and swelling index as determined in the manner abovedescribed.

The invention claimed is:

1. In an aqueous emulsion polymerization process for preparing latently crosslinkable polymers consisting essentially of a carboxylic acid monomeric constituent (1), an ester monomeric constituent (2) and a crosslinking monomeric constituent (3), all as hereinafter defined, wherein an emulsion of the monomers of the monomeric constituents is produced by agitating a reaction mixture consisting of water, the monomers, a catalyst and a base which is reactive with the carboxylic acid monomeric constituent to form carboxylate salts therewith to provide anionic salt groupings thereon, the improvement in combination therewith of incorporating in the monomer charge for copolymerization at least one monomer (4) selected from the group consisting of acrylamide, methacrylamide, acrylonitrile methacrylonitrile, cyanoethylacrylate and cyanoethylmethacrylate and maintaining the reaction mixture at a temperature no greater than about 45° C. to effect polymerization to produce a dispersion of a polymer in which said salt is polymerically combined, (1) said carboxylic acid monomeric constituent being selected from the group consisting of amic acid monomers and acid ester monomers having the formula

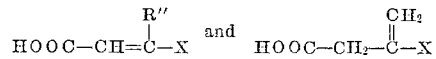

wherein is —CONRR' in the case of the amic acid monomers and is selected from the group consisting of —COOR and

in the case of the acid ester monomers, and in which R is alkyl as hereinafter defined, R' is either hydrogen or an alkyl group containing from 1 to 10 carbon atoms and R" and R''' are hydrogen or methyl, said carboxylic acid monomeric constituent selected from the groups of said amic acid and acid ester monomers consisting of
  (a) an individual amic monomer in which the R alkyl group contains from about 10 to 24 carbon atoms,
  (b) a mixture of amic acid monomers in which the number of carbon atoms in the R alkyl groups average from about 10 to 24, the amic acids of said mixture being selected from the group consisting of the amic acids containing from 1 to about 28 carbon atoms in the R alkyl groups thereof,
  (c) an individual acid ester monomer in which the R alkyl group contains from about 6 to 24 carbon atoms in the alkyl group,
  (d) a mixture of acid ester monomers in which the number of carbon atoms in the R alkyl groups average from about 6 to 24, the acid esters of said mixture being selected from the group consisting of the acid esters containing from 1 to about 28 carbon atoms in the R alkyl groups thereof, and
  (e) mixtures of amic acid and acid ester monomers selected from the group consisting of mixtures of (a) and (c) monomers, mixtures of (a) and (d) monomers, mixtures of (b) and (c) monomers and mixtures of (b) and (d) monomers;

(2) said ester monomeric constituent being selected from the group consisting of alkyl acrylate monomers and alkyl methacrylate monomers containing from 1 to 10 carbon atoms in the alkyl groups thereof, respectively; and (3) said crosslinking monomeric constituent consists of at least one polyethylenic monomer containing at least two ethylenic groups non-conjugated with respect to each other selected from the group consisting of (a) monomers in which said two ethylenic groups are terminal, (b) monomers in which each of said two ethylenic groups are non-terminal and conjugate with hetero double bonds in the monomer and (c) monomers in which one of said ethylenic groups is non-terminal and conjugate with a hetero double bond in the monomer and one of said ethylenic groups is terminal.

2. The process of claim 1 for the preparation of a pressure-sensitive adhesive polymer wherein relative proportion, by weight, of the carboxylic acid monomeric constituent (1) to the ester monomeric constituent (2) is within the range of 5:95 to 30:70; the crosslinking monomeric constituent (3) is present in an amount of from 0.25 to 5% by weight of the polymer; and the monomeric constituent (4) is present in an amount of from 1 to 10% by weight of the polymer.

3. The process of claim 2 wherein said carboxylic acid monomeric constituent (1) consists of a mixture of amic acid monomers of group (b), the crosslinking monomeric constituent (3) is a polyester of a glycol and an acid selected from the group consisting of acrylic acid and methacrylic acid and the monomeric constituent (4) is acrylonitrile.

4. The process of claim 2 wherein a water immiscible solvent in which the polymer is soluble and an acid to convert the carboxylate salt groupings to carboxylic acid groups are added to the dispersion whereby the polymer is dissolved in said solvent and separating the aqueous medium from the solution of the polymer.

5. The process of manufacturing a pressure-sensitive adhesive tape comprising preparing a pressure-sensitive adhesive polymer as in claim 2, separating the polymer from the dispersion thereof in the water, dissolving the polymer in an organic solvent for said polymer, spreading the solution of said polymer upon a backing surface to form a coating of the solution on the backing and heating said coating to evaporate the solvent and convert the polymer to a crosslinked pressure-sensitive adhesive polymer.

6. The process of claim 5 wherein said base is a volatile base.

7. The process of claim 6 wherein said base is ammonium hydroxide.

8. The process of claim 5 wherein the base is ammonium hydroxide to form ammonium carboxylate salt groupings, the polymer is separated from the dispersion by mixing said dispersion with a water miscible, organic liquid polar compound to coagulate the polymer, and the coating of the solution of the polymer is heated to evaporate the solvent and ammonia.

9. The process of claim 1 wherein sufficient base is provided in the reaction mixture to form salts with at least 45% by weight of the carboxylic acid monomeric constituent (1).

10. The process of claim 2 wherein sufficient base is provided in the reaction mixture to form salts with at least 45% by weight of the carboxylic acid monomeric constituent (1).

11. The process of claim 2 wherein sufficient base is provided in the reaction mixture to form salts with from 45 to 85% by weight of the carboxylic acid monomeric constituent (1).

12. The process of claim 2 wherein said carboxylic acid monomeric constituent (1) consists of a mixture of acid ester monomers of group (d); the ester monomeric constituent (2) is an alkyl acrylate; and the base in ammonium hydroxide provided in the reaction mixture in an amount sufficient to form salts with at least 45% by weight of the acid ester monomers.

References Cited

UNITED STATES PATENTS

| | | | |
|---|---|---|---|
| 2,533,204 | 12/1950 | Caldwell. | |
| 2,893,970 | 7/1959 | Caldwell et al. | 260—78.5 |
| 2,939,855 | 6/1960 | Bartl et al. | |
| 3,299,010 | 1/1967 | Samour | 260—80.72 |

MURRAY TILLMAN, Primary Examiner

W. J. BRIGGS, Sr., Assistant Examiner

U.S. Cl. X.R.

260—78, 78.5, 80.73, 80.8, 80.81; 117—122

UNITED STATES PATENT OFFICE
CERTIFICATE OF CORRECTION

Patent No. 3,492,260　　　　　　　　　　　　　　January 27, 1970

Carlos M. Samour et al.

It is certified that error appears in the above identified patent and that said Letters Patent are hereby corrected as shown below:

Column 7, line 29, "10.0" should read -- 0.15 --; line 51, "ath" should read -- bath --. Column 8, line 26, after "tempera ture" cancel "was"; line 37, "2-5" should read -- 2-B --. Colum 9, line 22, under "° F", cancel "Adh." and insert -- Adh. f. --; under "Oz.", "f." should read -- - --. Column 12, line 30, afte "wherein" insert -- X --. Column 14, line 25, "in" should read is --.

Signed and sealed this 22nd day of December 1970.

(SEAL)

Attest:

Edward M. Fletcher, Jr.　　　　　　　　　　　WILLIAM E. SCHUYLER, JR.

Attesting Officer　　　　　　　　　　　　　　　　Commissioner of Patents